(12) United States Patent
Bettis et al.

(10) Patent No.: US 7,826,831 B2
(45) Date of Patent: Nov. 2, 2010

(54) VIDEO BASED INTERFACES FOR VIDEO MESSAGE SYSTEMS AND SERVICES

(76) Inventors: Sonny R. Bettis, 2052 Perrin Dr., Lawrenceville, GA (US) 30043; Ian M. Moraes, 235 Richlake Dr., Suwanee, GA (US) 30024; Jon S. Plotky, 330 Victoria Station Blvd., Lawrenceville, GA (US) 30043; Philip L. Lowman, 661 Piney Spur Rd., Ellijay, GA (US) 30540; James H. Spencer, 3559 Castlehill Way, Tucker, GA (US) 30084

( * ) Notice: Subject to any disclaimer, the term of this patent is extended or adjusted under 35 U.S.C. 154(b) by 905 days.

(21) Appl. No.: 11/307,581

(22) Filed: Feb. 13, 2006

(65) Prior Publication Data

US 2007/0058647 A1   Mar. 15, 2007

Related U.S. Application Data

(63) Continuation-in-part of application No. 11/170,530, filed on Jun. 29, 2005, now Pat. No. 7,701,929.

(51) Int. Cl.
*H04M 3/42* (2006.01)
*H04M 3/493* (2006.01)
*H04L 29/06* (2006.01)

(52) U.S. Cl. ............... 455/414.3; 455/414.1; 455/414.2

(58) Field of Classification Search ................. 370/338; 455/414.1, 414.2, 414.3
See application file for complete search history.

(56) References Cited

U.S. PATENT DOCUMENTS

| | | | |
|---|---|---|---|
| 6,144,375 A | 11/2000 | Jain et al. | |
| 6,233,430 B1 * | 5/2001 | Helferich | 340/7.21 |
| 6,622,004 B1 * | 9/2003 | Sonoda et al. | 455/3.05 |
| 2001/0048753 A1 * | 12/2001 | Lee et al. | 382/103 |
| 2003/0128819 A1 * | 7/2003 | Lee et al. | 379/88.13 |
| 2003/0174210 A1 * | 9/2003 | Vimpari et al. | 348/152 |
| 2004/0203608 A1 * | 10/2004 | Osann, Jr. | 455/412.1 |
| 2004/0252761 A1 | 12/2004 | Brown | |
| 2005/0010955 A1 | 1/2005 | Elia | |
| 2005/0033821 A1 * | 2/2005 | Shin et al. | 709/217 |
| 2005/0048916 A1 * | 3/2005 | Suh | 455/39 |
| 2005/0138560 A1 * | 6/2005 | Lee et al. | 715/719 |
| 2005/0245241 A1 * | 11/2005 | Durand et al. | 455/414.1 |
| 2006/0064716 A1 * | 3/2006 | Sull et al. | 725/37 |
| 2006/0258289 A1 * | 11/2006 | Dua | 455/41.3 |

(Continued)

OTHER PUBLICATIONS

"The Truman Show". http://en.wikipedia.org/wiki/The_Truman_Show. Retrieved Oct. 21, 2008.*

*Primary Examiner*—Lester Kincaid
*Assistant Examiner*—Nathan Mitchell
(74) *Attorney, Agent, or Firm*—Smith Frohwein Tempel Greenlee Blaha; Gregory Scott Smith

(57) ABSTRACT

The user interface to a video based telecommunications system is enriched by the provision of multi-media user interfaces. The user interface may include active video portions along with instructional audio or may be icons or thumbnails representing available video information. Menu structures can be animated by changing the color or characteristics of the menu items in synchronization with the audio information and responsive to actions taken by the user.

16 Claims, 5 Drawing Sheets

U.S. PATENT DOCUMENTS

2006/0264239 A1* 11/2006 Tominaga ................... 455/558
2007/0021055 A1* 1/2007 Arseneau et al. ........... 455/3.06
2007/0143493 A1* 6/2007 Mullig et al. ............... 709/232
2008/0032739 A1* 2/2008 Hoodbhoy et al. ....... 455/556.2

* cited by examiner

VIDEO BASED INTERFACES FOR VIDEO MESSAGE SYSTEMS AND SERVICES

CROSS-REFERENCE TO RELATED APPLICATIONS

This application is a continuation-in-part of United States patent application filed on Mar. 15, 2005 and assigned Ser. No. 11/080,744, United States patent application filed on Jun. 29, 2005 and assigned Ser. No. 11/170,459, and United States patent application filed on Jun. 29, 2005 and assigned Ser. No. 11/170,530, each of which claim the benefit of the filing date of United States Provisional Application for patent entitled DISTRIBUTED IP ARCHITECTURE FOR TELECOMMUNICATIONS SYSTEM, filed on Jun. 30, 2004 and assigned Ser. No. 60/584,117.

This application is related to a United States patent application that has a title of DISTRIBUTED IP ARCHITECTURE FOR TELECOMMUNICATIONS SYSTEM WITH VIDEO MAIL, was filed concurrently with this application and is hereby incorporated by reference in its entirety. This application is also related to a United States Patent Application that has a title of IMPROVED BANDWIDTH UTILIZATION FOR VIDEO MAIL Ser. No. 11/307,593, a United States Patent Application that has a title of DELIVERY OF VIDEO MAIL AND VIDEO MAIL RECEIPT NOTIFICATIONS Ser. No. 11/307,578, and a United States Patent Application that has a title of VIDEO SERVICES DELIVERED TO A CELLULAR HANDSET Ser. No. 11/307,579 all of which were filed concurrently with this application and are hereby incorporated by reference in their entirety.

BACKGROUND OF THE INVENTION

The present invention relates to the provision of video based interfaces and multi-media interfaces and experiences for video based telecommunications platforms and, more specifically to various features, functions, and aspects of providing video oriented user interfaces, control and content delivery for a video messaging system.

If you head out anywhere in public today, you are certain to see someone hunched over a BLACKBERRY device, feverishly typing away on a miniature key board with their thumbs. What are they doing? They are one of the many people that are consumed in the email-age of our planet. And if you don't see such a sight, you are certain to see a handful of people busily chatting away on their cellular telephones, leaving messages are retrieving their voice mail. The evidence is certainly in—we live in a connected world.

What's next? Cellular technology is continually under construction. In the early 1980's, cellular technology was based on analog technology and was referred to as the analog mobile phone system (AMPS). As technology developed, digital systems were introduced including TMDA, CDMA and GSM system. The migration to digital technology opened up the cellular infrastructure to a wide range of additional features including email delivery, short messaging and the like. Advancements in technology have built on the digital cellular technology, thereby improving the bandwidth capacity and functionality of the cellular infrastructure. Today, the cellular infrastructure is rapidly migrating to the third generation wireless technology, otherwise termed as 3G, while others are already at work defining the fourth generation cellular technology. 3G technology takes another step in our electronic connectedness by increasing the bandwidth available, and thereby enabling the delivery of video information over the cellular network in a manner that somewhat user enjoyable. However, many complexities are present in actually developing and deploying user friendly, bandwidth efficient, reliable and user desired video based services over the wireless network. Even though bandwidth capacities are greatly increased, the transmission of video information can still be cumbersome.

In providing video messaging solutions over a 3G wireless network, an important issue is the provision of a useful, effective and bandwidth efficient user interface. Thus, there is a need in the art for a solution to provide state-of-the art user interfaces and video functionality that efficiently utilizes the bandwidth available in the cellular infrastructure. Such a solution should not only benefit the current cellular technology, but also be applicable for the efficient use of bandwidth in future migrations of cellular technology.

In addition, with the greatly increased capacities in bandwidth, the development and deployment of new, improved and novel user interfaces and service delivery can be realized. The easier, more convenient and functionally rich a product can be made, without hindering performance, the better the product will sell in the market. Thus, there is a need in the art for improved techniques for implementing user interfaces and service delivery over video enabled digital wireless networks.

BRIEF SUMMARY OF THE INVENTION

Various embodiments and aspects of the present invention meet the above-listed needs in the art, as well as others that will be more fully appreciated upon reading the detailed description, accompanying figures and the claims. In general, the present invention includes techniques for providing video interfaces for video mail or video messaging systems. In one embodiment, in response to receiving an incoming call, a multi-media message may be sent to the calling party. The multi-media message may be based on a video feed of the called party. For instance, in one embodiment the multi-media message may state that the called party is not available and providing instructions to the calling party. Alternatively, or in addition to, the multi-media message may include video and/or audio content identifying the options available to the caller. Ultimately, if the call is passed over to a mail servicing machine, the caller may be prompted to provide an audio and/or video clip for the message. The video and/or audio message may then be pushed to the called party using various techniques.

Another aspect of the present invention involves enhancing the user interface of a video based mail or messaging system by incorporating various video capabilities. For instance, one aspect of the present invention includes notifying a subscriber of the reception of a video mail message by converting a video mail message to a piece of clip art by taking a snap shot of the message. The thumbnail can then be forwarded to the user's email box or cellular telephone to indicate a video mail message is available for viewing. The clip art and thumbnails can be used to identify various video feeds available as well.

Another aspect of the present invention is the employment of various user interface features including: (a) menus that include a logo place holder, (b) color prompts to improve intuitiveness, (c) background effects to over rich multimedia experience, (d) customization to reflect branding, (e) status notification to let subscribers know message playback is in process.

Another aspect of the present invention is based on the technology of separating the video experience from the audio experience in a voice mail or telephone based interface system. In one embodiment, a static or still image such as a menu etc. is sent to the phone for display but the audio independently repeats or cycles through the options/instructions/prompts. There is synchronization of the audio and video within a menu, but only on a menu page basis. Active video may also be provided. One embodiment may use synchronized audio and another embodiment is independent audio. These and other aspects of the present invention will be more appreciated by reading the detailed description and the figures, along with the claims.

BRIEF DESCRIPTION OF THE SEVERAL VIEWS OF THE DRAWING

Various aspects, features and advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The present invention is directed towards the provision of video based interfaces and features for video mail or messaging systems and/or services. Now turning to the drawings, in which like labels refer to like elements throughout the several views, various aspects and features of the present invention are described.

Figure 1:
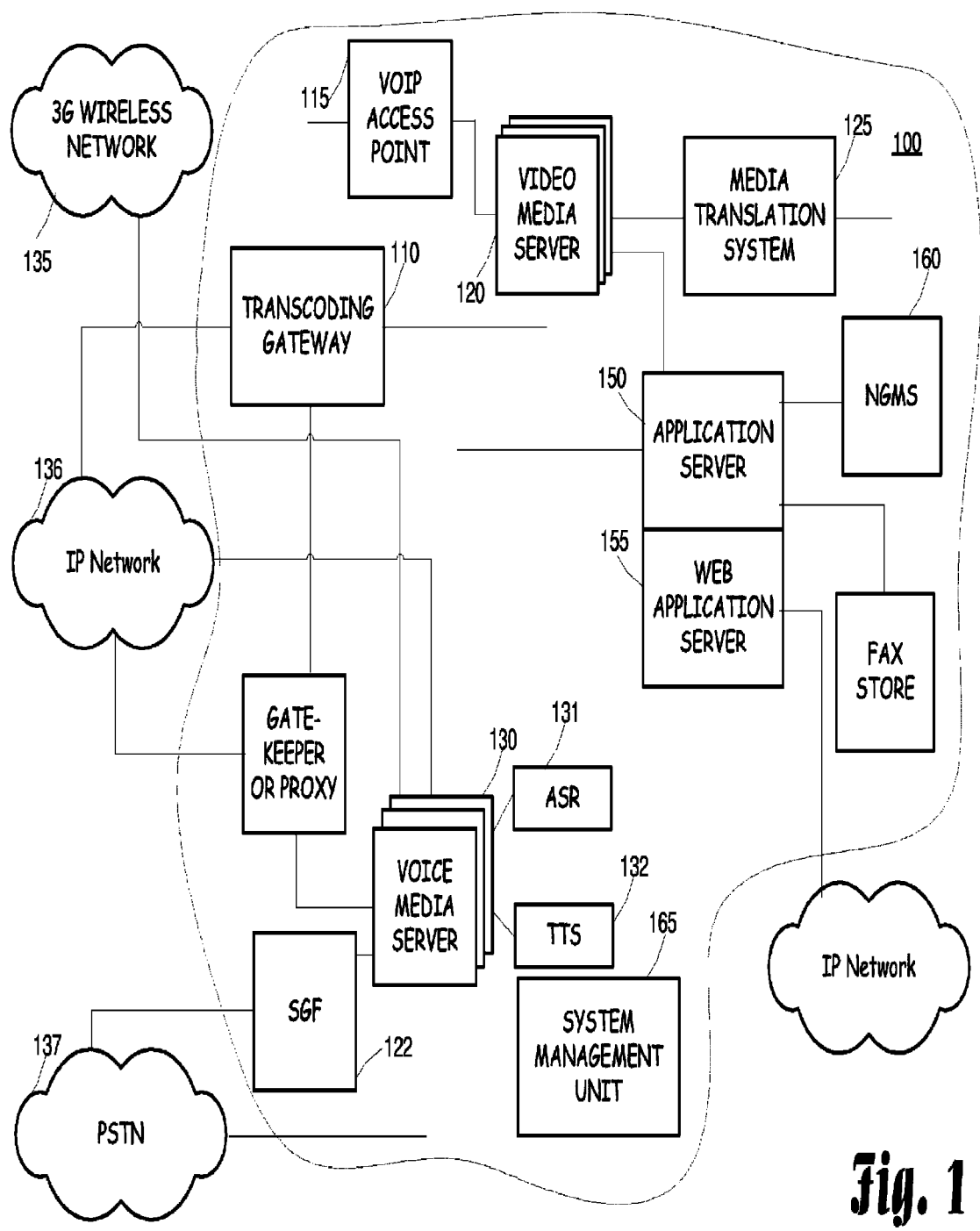
FIG. 1 is a block diagram illustrating a distributed telecommunications platform that incorporates elements to provide video mail capabilities.

FIG. 1 is a block diagram illustrating a distributed telecommunications platform that provides video mail capabilities over a digital wireless network, as well as other telecommunication capabilities over the wireless and wired telecommunications system. It should be appreciated the overall architecture of this system is the subject of a separate application for patent and is provided in this description only for illustrative purposes. As such, the illustrated system simply provides on possible platform for implementing various embodiments of the present invention and is not provided as a limiting example. The illustrated next-generation communications platform 100 employs a distributed IP architecture and is connected to the Public Switched Telephone Network (PSTN) 137 and a third generation wireless network 135. The communications platform 100 is illustrated as including a signaling gateway function (SGF) 122, one or more voice media servers 130, one or more system management units (SMU) 165, one or more application servers (AS) 150, one or more next generation message stores (NGMS) 160, a transcoding gateway 110 and one or more video media servers 120.

In general, the SGF 122 serves as the Signaling System 7 (SS7) interface to the PSTN 137 and allows one or more components or sub-systems to share the same point code (thereby reducing the need for destination point codes (DPC) and signaling links for call-control. This makes the telephonic system appear as single trunk group in the network, although sharing the same point code does not necessarily mean all the trunks are in a single trunk group. The voice media server 130 terminates IP and/or circuit switched traffic from the PSTN via a multi-interface design and is responsible for trunking and call control. The application server module 150 generates dynamic VoiceXML pages for various applications and renders the pages through the voice media server 130 and provides an external interface via a web application server configuration. The SMU 165 is a management portal that enables service providers to provision and maintain subscriber accounts and manage network elements from a centralized web interface. The NGMS 160 stores voice messages, subscriber records, and manages specific application functions including notification.

In general, video mail is implemented in the telecommunications platform 100 by including a transcoding gateway 110, a voice over IP access point (VOIP access point or VAP) 115, one or more video mail servers 120, and a media translation engine 125. The transcoding gateway 110 interfaces to a third generation wireless network (3G wireless network or other digital wireless network) 135 over an E1 interfaces that supports the H.324M and 3G-324M protocols or other similarly capable protocols that are in existence or are developed in the future. In addition, the transcoding gateway 110 interfaces to an IP network 136 over an H.323 interface and to the video media server 120 over another H.323 interface.

The transcoding gateway 110 is used to process incoming video messaging traffic and it physically resides between the networks (3G, IP, PSTN) and the video media server 120. The transcoding gateway 110 utilizes both E1 and IP interfaces to the networks and in an exemplary embodiment, interfaces to the video server 120 over an IP interface. In an embodiment of the present invention, the transcoding gateway 110, operates to provide transcoding and proxy functions for call signaling, call setup, command, control and indication between various multimedia systems standards including H.324M/3G-324M, H.323 and SIP. The transcoding gateway 110 preferably supports multiple voice and video codecs. The transcoding gateway 110 is operable to automatically handle clients by: detecting capabilities of client and matching and converting command and control media session announcements. In addition, the transcoding gateway 110 enables universal media experience by including capabilities exchange and mode selection to support a wide variety of devices, handsets and suppliers without the need for customization of the network.

One advantage of using a transcoding gateway 110 is that the video telephony calls can be presented to the video media server 120 in a single audio/video format. Thus, the video media server 120 may not need to provide any transcoding capabilities. Another advantage is that the transcoding gateway 110 can perform all the error handling on the interfaces to the network. Thus, the video media server 120 is not necessarily required to recreate full video frames from the video data stream. These two advantages allow the interface of video media server 120 to be simpler and thus, the video media server 120 will be less expensive yet able to handle more simultaneous calls. The transcoding gateway 110 can be proprietary or one of the commercially available products, such as the one available from Dilithium Networks (the DTG 2000), which provides up to eight E1 interfaces, as well as IP network interfaces.

Another potential advantage to using a transcoding gateway 110 is that some network operators already have them deployed in their networks to provide calling capabilities between the 3G and IP networks. Thus, in deploying embodiments of the present invention, the systems could exploit the existing transcoding gateways.

The VOIP access point 115 operates to balance traffic across the video mail servers 120. More specifically, the VOIP access point 115 distributes calls received at the transcoding gateway 110 to one of the video media servers 120 in such a manner to balance the load between the available video media servers 120.

The video media server 120 operates to terminate IP video traffic and is responsible for call set up and control of video telephony or otherwise provide the management of any video messages within the system. The voice media server 120 can process input from a user in DTMF format (much like a web client gathers keyboard and mouse click input from a user) but can also employ other techniques for information input, such as voice recognition. It then presents content to the user in video and voice form (similar in principle to graphic and text display back to the user on a PC client). This client server methodology enables rapid creation of new applications and quick utilization of content available on the World Wide Web. In an exemplary embodiment, each voice media server 120 includes a client interface for callers and supports voiceXML and Java Script. The application environment for the video mail servers 120 is similar to that as described for the voice media servers 130 below. Each video media server 120 can support approximately between 30-60 simultaneous video calls. Further features of an exemplary video media server 120 include providing call data records, logging and alarm management, telephony management functions, and host media processing.

When a video call is received by the system, the video media server 120 answers the call just as if it were a video-capable terminal. No special client is required on the caller's videophone. The video media server 120 prompts the caller with both voice prompts and video displays. When recording a message, the video media server 120 captures both the video and audio data, keeping the data synchronized for playback.

The video media server 120 processes incoming calls via requests to the applications server 150 using HTTP. A load balancer directs traffic arriving at the video media server 120 to one of a plurality of applications servers 150. This functionality ensures that traffic is allocated evenly between servers and to active servers only. The video media server 120 works as the VoiceXML client on behalf of the end user in much the same manner as a client like Netscape works on behalf of an HTML user on a PC. A VoiceXML browser residing on a video media server 120 interprets the VoiceXML documents for presentation to users.

The video media server 120 interfaces with transcoding gateway 110 using H.323. The transcoding gateway 110 translates the various audio and video codecs used in 3G-324M and H.323 to G.711 audio and H.263 video for the video media server 120. The VoIP Access Point (VAP) acts as a load balancer to direct incoming calls among the available voice media servers 120. Each video media server 120 constantly communicates its status to the VAP. The VAP routes calls only to video media servers 120 that are running and ready for traffic. Call Detail Records (CDRs) are provided, as well as SNMP alarming, logging, and transaction detail records.

The application server 150 operates to generate dynamic voice XML (VXML) pages or information, manages application processing of any video content and includes an external interface through the web application server 155. The application server 150 interfaces to both the video media servers 120 and the voice media servers 130 and, in response to various requests received from the video media servers 120 and the voice media servers 130, generates appropriate VXML pages or data. Utilizing a web application infrastructure, the application server 150 interfaces with backend data stores (such as the NGMS 160 or user profile databases, content servers or the like). The utilization of the web application infrastructure allows for separation of the core service logic (i.e., providing the business logic) from the presentation details (VXML, CCXML, SALT, XHTML, WML) to provide a more extensible application architecture.

In an exemplary embodiment, the applications server 150 utilizes Java 2 Enterprise Edition (J2EE) environment and Java Server Pages (JSP) to create the dynamic VoiceXML pages for the media servers. To create an environment for easy application development, the applications server 150 supports Template+JSPs. Applications are implemented in JSPs using a proprietary API. These JSPs are readily modifiable making changes in application behavior and creation of new applications very easy.

The voice media server 130 terminates IP and circuit-switched voice traffic and is responsible for call set up and control within the system. The voice media server 130 processes input from the user in either voice or DTMF format (much like a web client gathers keyboard and mouse click input from a user). It then presents the content back to the user in voice form (similar in principle to graphic and text display back to the user on a PC client). This client server methodology enables rapid creation of new applications and quick utilization of content available on the World Wide Web.

The voice media server 130 processes incoming calls via requests to the application server 150 using HTTP. A load balancer directs traffic arriving at the voice media server 130 to one of a plurality of applications servers 150. This functionality ensures that traffic is allocated evenly between servers, and to active servers only. The voice media server 130 works as the VoiceXML client on behalf of the end user in much the same manner as a client like Netscape works on behalf of an HTML user on a PC. A VoiceXML browser residing on the voice media server 130 interprets the VoiceXML documents for presentation to users.

The voice media server 130 interfaces with the PSTN, automatic speech recognition server (ASR) 131 and text-to-speech server 132 (TTS) and provides VoIP (SIP, H.323) support. Incoming circuit switched voice data in 64-kilobit micro-law or A-law pulse code modulation (PCM) format is compressed using G.726 for voice storage in the NGMS 160. VoIP is supported through G.711 and G.723 voice encoding. The voice media server 130 contains a built-in abstraction layer for interface with multiple speech vendors—eliminating dependency on a single ASR 131 or TTS 132 vendor.

The voice media server 130 can include built in codecs and echo cancellation. Call detail records (CDRs), used by service providers for billing purposes, are provided as well as SNMP alarming, logging, and transaction detail records.

Each of these sub-systems are described in more detail in the U.S. patent application Ser. No. 11/080,744 which was filed on Mar. 15, 2005 and to which this present application is a continuation-in-part and thus, is incorporated herein by reference.

The NGMS 160 is utilized to store voice and video messages, subscriber records, and to manage certain application functions such as notification schedules. The NGMS 160 is preferably designed with fully redundant components and utilizes reflective memory and Redundant Array of Independent Disks (RAID) technology for fault tolerance, immediate fail over and recovery.

The NGMS 160 has notification interfaces to SMPP for SMS, SMTP for email, and SMS Alert enabling SMS direct to the handset over SS7.

The media translation engine 125 operates to translate message data between different types of encoding. For instance, the media translation engine 125 can operate to convert message data between voice and data formats and encodings. One aspect of the media translation engine 125 is that it enables the playback of video messages on a device or telephone that does not support video, as well as the playback of voice only messages on video based calls. The media translation engine 125 also provides conversion for web message access and email message delivery. Preferably, the media translation engine 125 includes a dedicated digital signal process for high throughput.

The system management unit (SMU) 165 communicates with each of the other elements and/or components in the system to provide provisioning services, alarm management and collection of customer data records (CDR). The SMU provides a centralized point for service providers to manage all network elements, providing remote access, maintenance, and backup functionality. As such, the system management unit 165 provides system configuration and setup, network management and system monitoring, statistics and reporting, fault management and alarms, subscriber and mailbox administration, computer interface for centralized provisioning, CDR capture for billing, as well as other services.

The SMU 165 provides a single interface for provisioning, alarming, reports, and subscriber migration. The SMU 165 integrates and customizes systems with new elements and applications, and provides operational support and network management functions for carriers experiencing swiftly growing networks and exploding traffic volumes. Core features of the element management component include:

Element Auto-Discovery—when service providers add new network elements, the SMU 265 automatically recognizes them and includes the new elements in the graphical network map.

Graphical Network Map—a network/cluster map and map editor provides a snapshot of the entire network or cluster and facilitates quick problem identification and resolution.

Time Synchronization—a central time source ensures all network components maintain a uniform time reference across the entire messaging network—important for any distributed architecture.

Centralized network logging—logging for the entire messaging network is centralized on the SMU 165.

For system configuration and setup, the SMU 165 supports the functions of Class of Service (COS), software configuration and setting up and initializing system parameters. The network management and system monitoring aspect of the SMU 165 supports the functions of real-time system monitoring of hardware and software, tracking of resource usage and monitoring traffic statistics and load. The SMU 165 also provides statistics and reporting through supporting standard built-in reports, custom reports and usage and loading reports. The SMU 165 provides fault management and alarms by supporting a centralized logging and reporting of faults, alarms in real time and discovery functions. Subscriber and mailbox administration is provided in the SMU 165 through supporting the ability to add, delete, modify, query and configure subscriber records, defining features on a subscriber basis and maintaining subscriber records and COS creation. The SMU 165 provides a computer interface for centralized provisioning including automated provisioning directly from external billing/provisioning systems via a flexible key-word interface.

The SMU 165 uses a dual processor computer and allows remote dial-in for access to the SMU 165 as well as all other servers in the system via Telnet. Backup of system configurations and other critical data is also accomplished via the SMU 165.

The next generation message store (NGMS) 160 operates to store voice messages, video messages and subscriber records, as well as manages specific functions including notification. Thus, in the illustrated embodiment, the NGMS 160 provides storage for both voice and video messages. The system can employ the use of multiple NGMS components to increase the memory size and the number of subscribers that can be supported.

The SGF 122 offers a consolidated SS7 interface creating a single virtual SS7 signaling point for the system. SS7 provides the extra horsepower networks need, whether large or small. Sigtran interface (IETF SS7 telephony signaling over IP) to the media servers as well as IP Proxy functions are supported via SGF. Consolidating SS7 provides the benefits of reduced point codes and easier maintenance.

The availability of point codes is typically limited. The consolidation of signaling links eases the pressure on these resources or eliminates the need for additional point codes altogether. In this way, the SGF 122 provides immediate network simplification and cost savings. The SGF 122 presents the appearance of a single identity to the SS7 network via the single "virtual" point code of the network and recognizes and processes messages in a transparent manner. The SGF 122 reduces the maximum number of point codes needed in some cases from 50 to only 4.

Various features, advantages and benefits of the SGF 122 include:

allowing multiple multi-function media servers to share signaling links and point codes (PC) providing significant cost savings;

providing concentrated SS7 signaling links;

providing one trunk group across multiple multi-function media servers; and requiring less SS7 links resulting in reduced monthly connection fees Thus, the present invention includes an integrated telecommunications platform that supports video mail, voicemail and optionally fax messages simultaneously with simplified access to each type of message. The NGMS 160 provides message storage and retrieval for video, voice and fax within a subscriber's mailbox. In one embodiment, the subscriber can access video mail, voicemail and fax messages separately, and in another embodiment, the subscriber can access all messages in an integrated manner. A single user profile can be defined to support all of the available services. The SMU 165 provides the provisioning interface to access the subscriber records and to enable and disable services. Individual services such as video mail, voicemail and fax can be selected and configurable on a class of service and user profile basis.

The video deposit operation stores video message content in a different format from voice messages. Incoming video messages are recorded on the video media server 120. The recorded messages are saved as raw audio and video data—stored separately. The message durability techniques are then used to move these messages to the application server 150. Advantageously, storing the audio and video portions of the message separately decreases the complexity of the system. For instance, the data rates for audio and video are different, and the difference amount varies, making simple interleaving difficult. If the two data types were to be interleaved, an extended file format such as AVI or 3GP would have to be used. This would increase the processing load on the video media server 120. At playback time, the audio and video data must be fed separately to the video media server 120 software stack, at different and varying rates. If the streams are interleaved, additional processing and buffering are required on the video media server 120 to accommodate playback. In addition, there are circumstances when only a portion of a message (i.e., the audio portion or the video portion) needs to be retrieved. If the two data types were combined, the NGMS 160 would have to have knowledge of the internal structure of the data (e.g. AVI) to retrieve just the audio or video part. Storing the audio and video separately avoids this issue.

The NGMS 160 operates to manage both audio messages, as well as video messages with or without audio. An account and message database within the NGMS 160 keeps track of the video messages thereby allowing the current applications to work with video messages. Message waiting notification features available for voice messages are also applied for video messages. Thus, those skilled in the art will appreciated that the video, voice and fax messages are stored in the NGMS 160 and are accessible by the subscriber. FIGS. 2, and 3A-3C are disclosed in the above-referenced related patent application but are included and described again here for convenience in that some of the video based interfaces and features described are applicable in various embodiments of the present invention.

Figure 2:
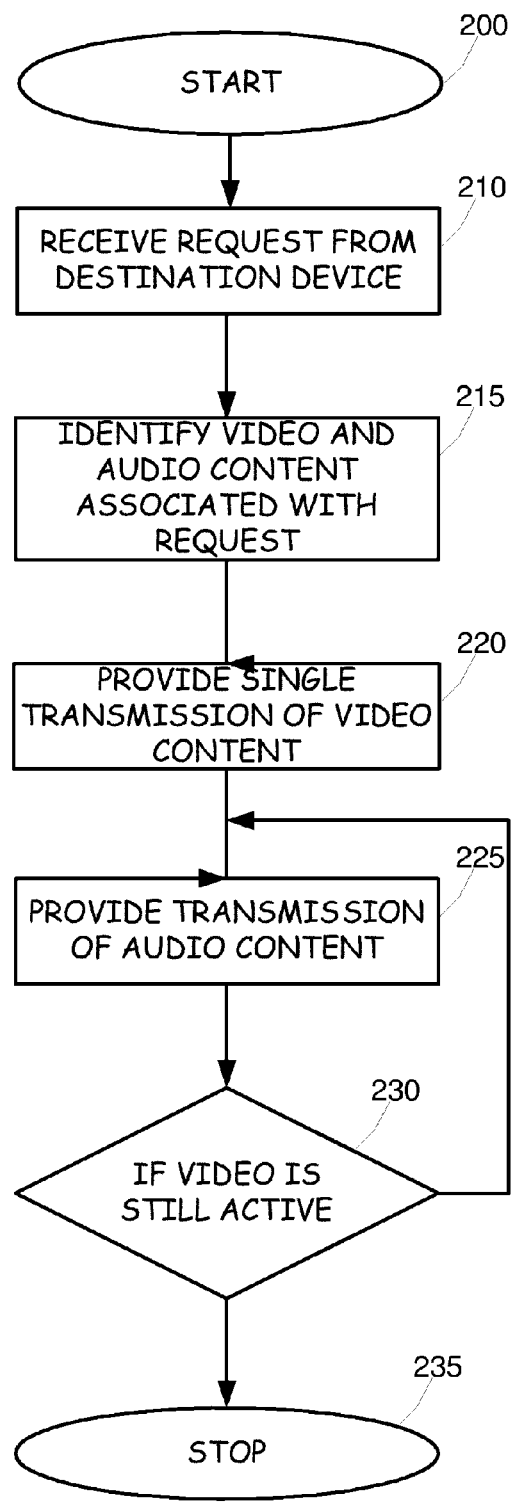
FIG. 2 is a flow diagram of an aspect of the present invention in providing bandwidth efficient delivery of still video content, such as menu screens.

FIG. 2 is a flow diagram of an aspect of the present invention in providing bandwidth efficient delivery of still video content, such as menu screens. The process 200 is initiated and the first step in the process is the reception of a request from a destination device 210, such as a digital wireless handset equipped with the ability to render video content. The request could be any of a variety of request, including calling in to retrieve the subscriber's voice mail, calling a subscriber and receiving the voice mailbox of the subscriber, calling an information service or the like. The request is typically processed by the video media server (120 in FIG. 1) but the processing could be shared by other systems or performed by other devices depending on the particular embodiment of the invention. In any of the scenarios, the request is received by the telecommunications system. The request is then processed to identify the video and audio content, if any, that is associated with the request 215. This process may involve a query to a message storage device that searches based on the particular parameters of the request, the identity of the calling party, the identity of the called party, or other characteristics.

Once the video and audio content associated with the request is identified, the video content is transmitted to the destination device 220. The audio content is likewise transmitted to the destination device 225 either in parallel or in proximity to the transmission of the video content. In general, the video content is a static display, such as a menu screen or other information screen and the audio content is associated with the video content. As a non-limiting example, if the video content is a menu screen with various options, the audio content can be a recitation of the options available on the menu screen and/or instructions to the user regarding the options available. Upon completion of the playback of the audio content, if the video content is still active on the destination device 230 (i.e., the user has not selected a menu option causing a transition to a new screen or an application) then the audio content is retransmitted to the destination device 225. However, if the video content is no longer active, then processing stops 235. Thus, it will be appreciated that this aspect of the present invention provides a continuous loop of the video and audio content until a user takes an action that invokes a status change, such as a request for additional content, cancellation of the playback, invoking an action, etc.

Advantageously, because the present invention operates to store the audio and video content separately, the audio content can be transmitted multiple times while the video content is only transmitted once. This aspect of the invention reduces the bandwidth requirements in providing such audio and video content to a destination device.

Figure 3A:
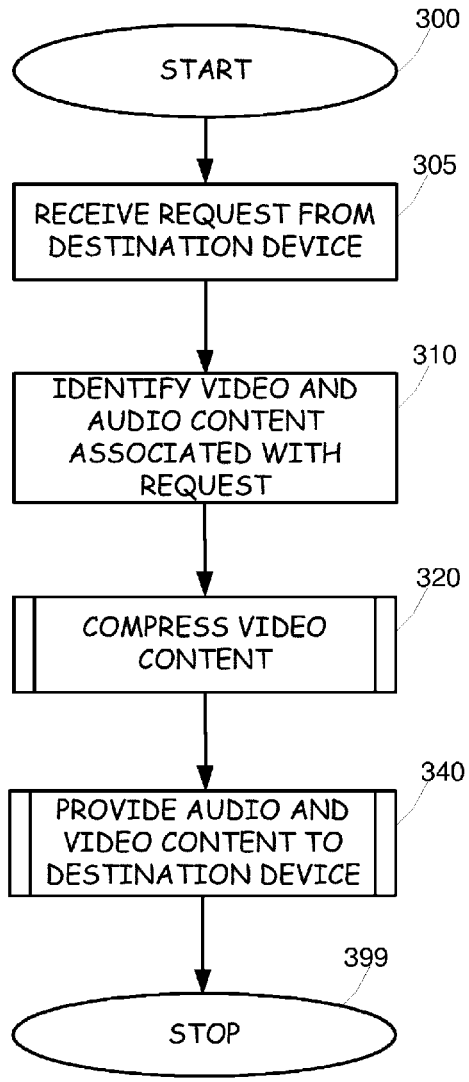
FIGS. 3A and 3B are flow diagrams embodiments of the present invention operating to provide bandwidth efficient delivery of active video content.
Figure 3B:
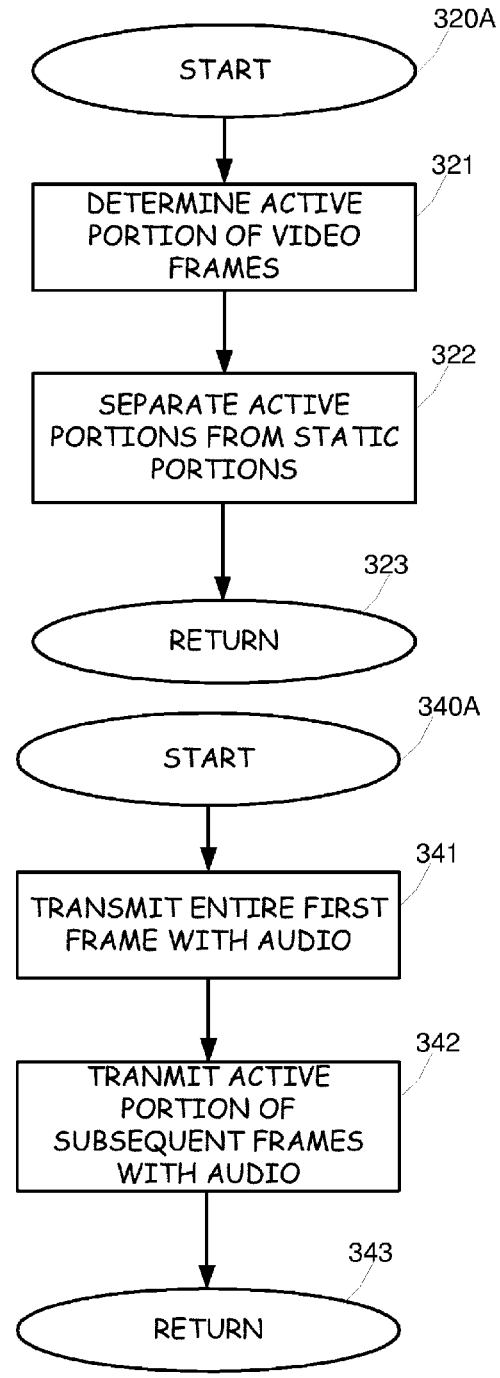
Figure 3C:
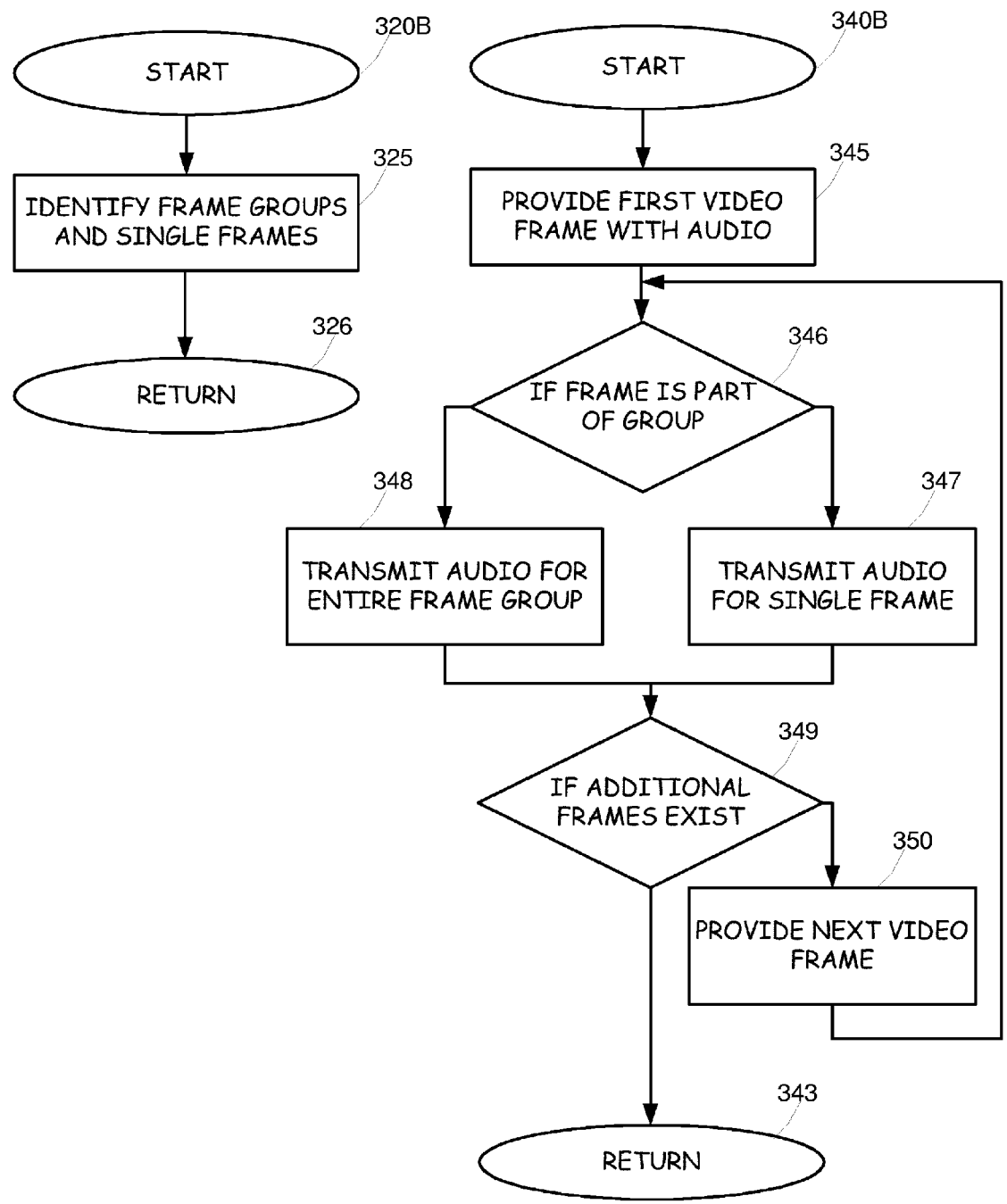
FIG. 3C is a flow diagram illustrating an embodiment of the invention in which compress is performed on a frame-by-frame basis.

FIGS. 3A and 3B are flow diagrams embodiments of the present invention operating to provide bandwidth efficient delivery of active video content. More specifically, FIG. 3A is the high-level flow chart for an embodiment of the present invention enabling the bandwidth efficient delivery of active video content. FIG. 3B is a flow diagram illustrating an embodiment of the invention in which compression of the video content is performed on a content level. FIG. 3C is a flow diagram illustrating an embodiment of the invention in which compress is performed on a frame-by-frame basis.

In FIG. 3A, the process 300 commences upon the reception of a request from a destination device 305. The destination device in this embodiment, as well as other embodiments described herein, can be any of a variety of devices, including digital wireless telephones, 3G enabled devices, computers, laptops, personal data assistance, pocket personal computers, or the like. Although the present invention is particular focused on the provision of bandwidth efficient video content to digital wireless devices, the various aspects and features of the present invention can be equally applied to the delivery of any video content.

The request from the destination device can take on a variety of forms. For instance, the request may simply comprise a destination device making a call to a number that is controlled or supported by a video mail system. Likewise, the request could be an action taken by a destination device during a telephonic connection to a video mail system or telecommunications system supporting video content. As non-limiting examples, the request could be invoked by a subscriber calling into his or her voice mail box, receiving a call from a subscriber, requesting a playback of video mail, traversing menu structures of a video mail system, a calling party rolling over to video mail to receive a subscriber's personal video message, or the like. In these examples, as well as other examples that will be readily apparent to the reader, the system operates to identify the video and/or audio content associated with the request 310.

Upon identifying the video and/or audio content, the video content is subjected to a compression process 320. The compressed video and any associated audio is then provided to the appropriate destination device 340. Processing then ends at 399 until the reception of another request or event that would invoke the delivery of additional content. FIG. 3B is a flow diagram illustrating an embodiment of the invention in which compression of the video content is performed on a content level. In this embodiment 320A, the video content is analyzed. The analysis can be conducted in a variety of manners, including but not limited to, (a) serially analyzing the video content as it is being transmitted, (b) analyzing the video content in buffered blocks or (c) analyzing the entire video content prior to transmission. Regardless of the technique employed, the active portions of the video content and the static portions of the video content are identified. For instance, in a series of menu screens to be delivered, the static content could be the background of the menu screen and the options or selections that do not change from screen to screen. The active content could be the menu items or, if options are high-lighted in synchronization with the audio, the active portions may include the bolding or high-lighting of the particular menu items. In a moving video picture image, the static content could be the background and other elements that are not moving, while the active content may include the moving objects. For instance, if the video picture image is a subscriber reciting a message, the background and portions of the subscriber that are not moving or are substantially still may be considered static, while the subscriber's mouth, eyes and other moving elements may be considered active content. Regardless of the particular technique employed, the active portions of the video are separated or distinguished from the static portions of the video 322. Processing then returns to step 340 in FIG. 3A.

Once the active and video content are identified and separated, the video content is delivered to the destination device 340A. In this embodiment, the entire first frame of the video content is transmitted to the destination device along with the synchronized audio 341. The entire first frame is transmitted because, in essence, the entire first frame would be considered active content. For the next and subsequent frames of the video content, only the active portions are transmitted along with the synchronized audio associated with that frame 342. Processing then returns to step 399 in FIG. 3A.

It will be appreciated that this embodiment of the present invention can deliver the video and audio content in a manner that reduces the bandwidth requirements. Because only the active portions of a video image are transmitted, the bandwidth requirements are reduced.

FIG. 3C is a flow diagram illustrating an embodiment of the invention in which compress is performed on a frame-by-frame basis. In this embodiment 320B, the video content is analyzed. The analysis can be conducted in a variety of manners, including but not limited to, (a) serially analyzing the video content as it is being transmitted, (b) analyzing the video content in buffered blocks or (c) analyzing the entire video content prior to transmission. Regardless of the technique employed, video content is grouped into similar of substantially similar frames and independent frames. The grouping is based on the comparison of content from one frame to the next. For instance, if several frames of a video stream are substantially similar or identical, these frames are considered to be in a group of frames. A grouping of frames can be caused by many factors, such as but not limited to, the subject of the video maintaining a constant position, the video being directed towards a static image such as a chalk board, a prototype or other static images, etc. In other circumstances, the content in the video stream may be rapidly changing and thus, independent frames, or frames that cannot be grouped together may exist. Once the frames or a portion of the frames have been analyzed, processing returns to step 340 in FIG. 3A.

The video content, once analyzed is then provided to the destination device 340B. The first video frame, which may represent a frame group or a single independent frame is transmitted to the destination device along with the associated and synchronized audio content 345. At step 346, if the first frame is an independent single frame, only the audio associated with that frame is transmitted 347. Alternatively, if the frame is associated with a frame group, the audio associated with each frame in that frame group is transmitted 348.

If additional frames need to be transmitted 349, the next video frame is obtained 350 and processing returns to step 346. Otherwise, processing returns to step 399 of FIG. 3A to await the next request for video content.

It should be appreciated that the above-described compression and bandwidth efficient techniques are simply one feature that can be incorporated into the present invention but, that various aspects, features and embodiments of the present invention that do not include such compression may also be described. One aspect of the present invention is the utilization of a multi-media voice mail reception message. In state of the art systems, a caller that is directed to a subscriber's or user's voice mail is greeted with a voice based greeting message and instructions. The present invention employs the use of video content to create a multi-media message for callers attempting to reach a subscriber of a video mail system. Thus, in response to receiving an incoming call for a subscriber, a multi-media message may be sent to the calling party. The multi-media message may be based on a video feed of the called party. For instance, in one embodiment the multi-media message may state that the called party is not available and provide instructions to the calling party. In a multi-media message, this could include a video clip of the called party greeting the caller and delivering the message, along with further instructions. The message delivered can be based on a variety of factors including time of day, the day of the week, weekend vs. weekday, calendar events, caller identification information, or any of a variety of scheduling or dependent criteria.

Alternatively, or in addition to, the multi-media message may include video and/or audio content identifying the options available to the caller. For instance, the caller may receive a quick video clip of the called party, and then be presented with a menu screen along with audio based instructions. In another embodiment, the video clip of the called party may continue with a menu screen being overlaid with the video clip. In another embodiment, the video clip itself may include the menu screens or menu buttons. The called party can audibly provide the instructions in the video clip or, system default audio may be provided. In another embodiment, still screens providing menu options can be interlaced with the video clip screens.

In addition, when an incoming call is passed over to a video mail servicing system, the caller may be prompted to provide an audio and/or video clip for the message. The video and/or audio message may then be pushed to the called party using various techniques. The message may be one that is instantaneously recorded by at that time with the calling party using a video camera and microphone device to create the message at that time or, it may be a pre-created message that was prepared by the calling party at an earlier time. Alternatively, the system can create a placeholder for a video message and then await the delivery of the video clip at a later time. Thus, in this embodiment of the invention, the calling party may simply leave a voice message, or no message at all, and then, at a later time create a video message to replace the audio message, if any.

Another aspect of the present invention involves enhancing the user interface of a video based mail or messaging system by incorporating various video capabilities. For instance, one aspect of the present invention includes notifying a subscriber of the reception of a video mail message by sending a thumbnail picture. The video mail message, or a portion thereof, is converted to a piece of clip art or thumbnail by taking a snap shot of the message. The thumbnail can then be forwarded to the user's email box or cellular telephone to indicate a video mail message is available for viewing. In an email delivery mechanism, the thumbnail may also include a hyperlink to the actual video file to invoke its delivery.

The clip art and thumbnails can be used to identify various video feeds available as well. For instance, in a video service system that provides a monitoring or surveillance service, a thumbnail can be provided to user to assist the user in accessing the system. In one embodiment, the monitoring service may be provided to a subscriber as a stand alone service. In this embodiment of the invention, the subscriber may call into the system and receive the thumbnail once the call is connected. Alternatively, the user may always have a thumbnail displayed on a user device that can be selected or activated to gain access to the system. In such an embodiment, the thumbnail may be static or it may periodically be updated to reflect a still shot of the monitored location. In another embodiment, once the service is accessed or prior to accessing the service, the subscriber may have a plurality of thumbnails with each thumbnail representing a different camera angle, different camera, different time frame, etc. In this embodiment the subscriber can simply select one of the thumbnails and then activate a live video feed for that particular thumbnail. In another embodiment, a video monitoring service or other video based service may be simply one service in a suite of available services. In this embodiment, when the subscriber calls into the system, he may be presented with several thumbnails, each representing an available service and possibly even a state for such service. For instance, for a monitoring system, the thumbnails may represent the last reading status from the location. For a television feed, the thumbnail may represent a single frame of the feed or, maybe even the most recent frame that included the score. For instance, video scanners can be employed to determine when the score is overlaid onto the video feed and the latest still shot of that frame may be maintained.

Thus, in operation of the various embodiments, a user or subscriber may initiate a call to the video service system and receive a multi-media user interface. The multi-media user interface may simply be a menu with audio, an animated menu screen with audio, a single or multiple thumbnail icon or screen that identifies the type of content, etc. The user can then access the content by selecting a menu item or icon. Alternatively, the user may be presented with video and audio content upon connection to the system. For instance, if a party is attempting to reach a video mail subscriber, the calling party may immediately receive a video message. If a subscriber is calling into a system to retrieve messages, the messages may immediately be displayed to the subscriber or, the subscriber may be presented with the multi-media menu system.

Figure 4:
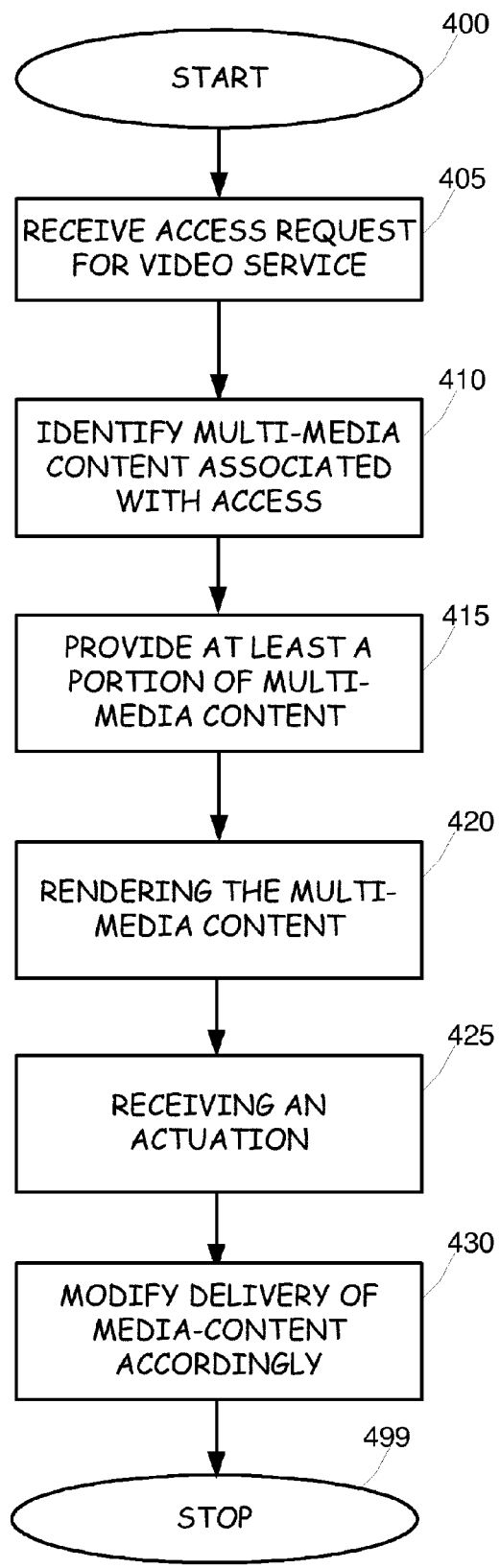
FIG. 4 is a flow diagram illustrating the steps involved in an exemplary embodiment of the present invention.

FIG. 4 is a flow diagram illustrating the steps involved in an exemplary embodiment of the present invention. The process 400 involves initially receiving an access request at a communications platform 405. The access request is received from a video capable device and associated with a video based service. The multi-media content associated with the access request is then identified 410. The multi-media content includes video content and audio content. At least a portion of the multi-media content is then provided to the requesting device 415. The portion could be the video and audio content itself, or it may be a clip of the available video and audio content. Likewise it may simply be a thumbnail extracted from the video content or an icon that represents the type of video content (i.e., video mail, monitoring information, movie trailer, advertisement, instructions, etc.). Once the portion of the multi-media content is received, the device renders the content by displaying it on a display of the device 420. While the multi-media content is displayed, a user may actuate a function pertaining to the content. Such an actuation results in a signal being sent to the video services system 425. The actuation could be the selection of a menu item, the selection of a thumbnail or icon, or the request to commence playing video content, pause the playback, stop the playback, etc. Once the actuation signal is received, the provision of the multi-media content is modified based on the actuation. This modification could be changing from one menu screen to the next, commencing the delivery of synchronized audio and vide content, opening a live audio/video feed, etc.

Another aspect of the present invention is the employment of various user interface features including: (a) menus that include a logo place holder, (b) color prompts to improve intuitiveness, (c) background effects to over rich multimedia experience, (d) customization to reflect branding, (e) status notification to let subscribers know message playback is in process.

For the various menu structures, the present invention may utilize a logo place holder that can be used to customize the video mail experience. In one embodiment, the logo place holder may be a small section on the menu screen dedicated to identify the company providing the service, the company that the subscriber is affiliated with, or any other information that the subscriber may wish to be conveyed. For instance, the logo place holder may simply contain a picture of the subscriber or, in other embodiments may be enable to receive a video feed of the subscriber providing a message to callers.

Another aspect of the present invention is to animate a menu structure by providing active video content on the menu. In one embodiment, as menu items are described in a synchronized audio feed, the menu items can be augmented or enhanced. Such actions may include bolding or flashing all or a portion of the menu item, of changing the color of the menu items. In addition, color prompts may be employed in the user interface to improve intuitiveness of the user interface.

Another aspect of the present invention is to provide a video feed or video content as the background effect for a receiver device. Thus, when the device is idle, video content can be displayed on the display area. Such content may include a default video feed, such a surveillance camera or a certain television show, or any of a variety of other live or delayed video feed.

Another aspect of the present invention is the enablement of customization to reflect branding. Because the menu items and all user interface structures can be based on video content, an wide variety of content for branding purposes may be incorporated into the user interface, including color, logos, artwork, as well as multi-media content such as commercials, jingles, etc.

Another aspect of the present invention is the inclusion of status notifications within a video feed to notify the subscriber that message playback is in process. For instance, a flashing icon can be overlaid on video content to indicate that this is a delayed feed or a live feed.

Another aspect of the present invention is the use of video mail broadcasting. This aspect of the present invention is focused on the ability to broadcast video mail messages to multiple parties. Similar to broadcast emails and voice mails, a video message that is recorded on the fly or pre-recorded can be sent to multiple recipients by the provision of a menu selection structure, a send list, etc. The video message can then be sent to each person selected or identified in a list, and the various delivery mechanisms can be employed.

Thus, it has been shown that the present invention provides a system and a technique for providing video based user interfaces for video mail and message systems and services. Although the primary application for the invention has been described as providing video content over a digital cellular wireless network, those skilled in the art will appreciate that the various aspects and features of the present invention can be equally applied in the delivery of video content over any transmission medium. Thus, the present invention has been described using detailed descriptions of embodiments thereof that are provided by way of example and are not intended to limit the scope of the invention. The described embodiments comprise different aspects and features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method for providing a multi-media user interface to a calling party over a digital wireless telecommunications network, the method comprising the steps of:
   receiving at a communications platform an access request to a multi-media message store associated with a first party, the access request being received from a video capable device that is associated with a video based service, wherein the video capable device is associated with a second party and the access request is for the purpose of depositing a multi-media message into the first party message store;
   identifying multi-media content uniquely associated with the message store of the first party, the multi-media content including video content and audio content;
   providing at least a portion of the multi-media content to the requesting device, wherein the provided portion comprises instructions to the second party for navigation of the communications platform, prior to deposit of a multi-media message into the first party message store, via actuation of the requesting device;
   rendering the at least a portion of the multi-media content on the requesting device;
   receiving an actuation from the requesting device; and
   augmenting the provision of the multi-media content based on the actuation.

2. The method of claim 1, wherein the step of providing at least a portion of the multi-media content further comprises:
   creating a thumbnail screen representing the video content; and
   transmitting the thumbnail screen to the requesting device.

3. The method of claim 2, wherein further comprising the steps of:
   associating a hyperlink with the thumbnail screen, the hyperlink being operative to direct the accessing device of the second party to a file containing the multi-media content that is uniquely associated with the message store of the first party;
   traversing the hyperlink; and
   receiving the multi-media content.

4. The method of claim 1, wherein the video content of the multi-media content comprises a plurality of video frames and further comprising the steps of:
   determining that the video content of the plurality of video frames includes some active video portions;
   separating the active video portions from static video portions; and
   providing at least a portion of the multi-media content to the requesting device of the calling party further comprises:
   initially providing and entire first frame that includes the active and static video portions; and
   providing only the active portions of subsequent video frames.

5. The method of claim 4, wherein the video content is a series of menu screens with menu items, the active portions of the video frames include serially augmenting each menu item in the menu screen, and the audio content is associated with the menu items of the series of menu screens, and the steps of providing the multi-media content to the requesting device of the calling party further comprises synchronizing the provision of the audio content with the video content such that as each menu item in the menu screen is augmented, the audio content associated with the augmented menu item is provided.

6. The method of claim 5, wherein the actuation received from the requesting device of the second party is a selection of a menu item and the step of augmenting the provision of the multi-media content based on the actuation comprises providing separate multi-media content associated with the menu item.

7. The method of claim 6, wherein the step of providing separate multi-media content comprises providing a video feed associated with a monitoring system.

8. The method of claim 6, wherein the step of providing separate multi-media content comprises providing a video feed associated with a particular camera of a monitoring system.

9. A telecommunications system that provides a multi-media user interface to user devices over a digital wireless telecommunications network, the telecommunications system comprising:
   a transcoding gateway interfacing to the digital wireless network for receiving control, video and audio content and for providing response, video and audio content to the user devices on the digital wireless network;
   a message store associated with a first party for storing video and audio content;
   a video media server interfacing to the transcoding gateway and the message store, and in response to being accessed by a second party calling device, being operable to:
      identify the multi-media message store associated with the first party;
      identify video and audio content associated with the multi-media message store of the first party;
      provide at least a portion of the video content and audio content to the second party calling device;
      receive actuation signals from the second party calling device; and
      modify further provision of video and audio content based on the received actuation signal.

10. The telecommunications system of claim 9, wherein the video media server is operable to:
    process the video content through a compression technique by determining that the video content is a still image; and
    provide the processed video and audio content to the destination device in a synchronized manner by providing the still image to the destination device a single time, independent of the manner for providing the audio content, and providing the audio content in a loop while the still image is being displayed on the destination device.

11. The telecommunications system of claim 9, wherein the video content comprises a plurality of video frames and the video media server is operable to provide the video content through a compression technique by:
    determining that the video content of the plurality of video frames includes some active video portions;
    separating the active video portions from static video portions; and
    the video media server is operable to provide processed video and audio content to the destination device by:
    initially providing and entire first frame that includes the active and static video portions; and
    providing only the active portions of subsequent video frames.

12. The telecommunications system of claim 11, wherein the video content is a series of menu screens with menu items, the active portions of the video frames includes serially augmenting each menu item in the menu screen, and the audio content is associated with the menu items of the series of menu screens, and the video media server is operable to provide the audio content to the destination device by:
   synchronizing the provision of the audio content with the video content such that as each menu item in the menu screen is augmented, the audio content associated with the augmented menu item is provided.

13. The telecommunications system of claim 9, wherein the video content comprises a plurality of video frames and the video media server is operable to process the video content through a compression technique by identifying a first frame group of contiguous frames of the plurality of video frames in which the video content is substantially static; and
   the video media server is operable to provide the processed video and audio content to the destination device by providing only a single frame of the first frame group.

14. The telecommunications system of claim 13, wherein the video media server is further operable to:
   identify a second frame group of contiguous frames of the plurality of video frames in which the video content is substantially static; and
   provide the processed video content to the destination by providing only a single frame of the second frame group.

15. The telecommunications system of claim 14, wherein the video media server provides a next frame to the destination device after the single frame of the first frame group and the next frame may be a single frame of the second frame group or a single independent frame.

16. The telecommunications system of claim 15, wherein the audio content is synchronized with the plurality of video frames, and the video media server provides the processed video and audio in a synchronized manner such that as the single frame of the first frame group is displayed, the audio content associated with the entire frame group is provided to the destination device and, when the next frame is provided to the destination group, the audio content associated with that next frame is provided.

* * * * *